(12) United States Patent
Kubryk et al.

(10) Patent No.: US 8,709,576 B2
(45) Date of Patent: Apr. 29, 2014

(54) CURVED STRUCTURAL PART MADE OF COMPOSITE MATERIAL AND A PROCESS FOR MANUFACTURING SUCH A PART

(75) Inventors: Vanessa Kubryk, Toulouse (FR); Nathalie Hellard-Lambic, Blagnac (FR)

(73) Assignee: Airbus Operations (SAS), Toulouse (FR)

( * ) Notice: Subject to any disclaimer, the term of this patent is extended or adjusted under 35 U.S.C. 154(b) by 209 days.

(21) Appl. No.: 12/621,666

(22) Filed: Nov. 19, 2009

(65) Prior Publication Data
US 2010/0136293 A1    Jun. 3, 2010

(30) Foreign Application Priority Data
Nov. 21, 2008    (FR) ..................................... 08 06562

(51) Int. Cl.
*B32B 5/12*      (2006.01)
*B32B 3/02*      (2006.01)
*B64C 1/06*      (2006.01)

(52) U.S. Cl.
USPC ........... 428/109; 428/105; 428/112; 428/174; 428/176; 428/121; 244/117 R; 244/119; 244/120; 244/123.1; 244/123.3; 264/239; 264/241; 264/257; 264/258

(58) Field of Classification Search
USPC ................. 428/105–114, 156, 174–177, 121; 244/117 R–120, 123.1, 123.3, 124; 264/239, 241, 257, 258
See application file for complete search history.

(56) References Cited

U.S. PATENT DOCUMENTS

| 5,151,236 A | 9/1992 | Azzara et al. |
| 2005/0042410 A1* | 2/2005 | Sakonjo et al. ............... 428/66.6 |
| 2008/0054122 A1* | 3/2008 | Bold ........................... 244/129.3 |
| 2010/0308165 A1 | 12/2010 | Markowski et al. |

FOREIGN PATENT DOCUMENTS

| EP | 0436415 B1 | 7/1991 |
| FR | 20070057431 | 9/2007 |
| WO | 2005011961 A1 | 2/2005 |
| WO | WO 2005/115839 | * 12/2005 |

* cited by examiner

*Primary Examiner* — Aaron Austin
*Assistant Examiner* — Megha Mehta
(74) *Attorney, Agent, or Firm* — Greer, Burns & Crain Ltd.

(57) ABSTRACT

The disclosed embodiments concern a curved structural part composed of a composite material with reinforced, continuous fibers whose cross section includes at least two wings, with said fibers extending from one wing to the other, with said structural part having a variation in the width of its section parallel to the local radius of curvature. The structural element that results from assembling the parts in the disclosed embodiments therefore has local widening of the section at the connections between the parts constituting a structural element, such as an aircraft fuselage frame, and widening at the connection with the floor profiles, if such a profile is used to make an aircraft fuselage structure. The disclosed embodiments also concern a process for manufacturing such a part, as well as a device for advantageously implementing such a process.

22 Claims, 6 Drawing Sheets

CURVED STRUCTURAL PART MADE OF COMPOSITE MATERIAL AND A PROCESS FOR MANUFACTURING SUCH A PART

CROSS-REFERENCE TO RELATED APPLICATIONS

This application claims priority to French Application No. 08 06562 filed on 21 Nov. 2008, the disclosure of which is incorporated by reference herein its entirety.

BACKGROUND

The aspects of the disclosed embodiments are in the field of structural parts made of a composite material with reinforced fibers. More specifically, the aspects of the disclosed embodiments concern a curved structural part used, for example, to make a circumferential stiffener or frame of a shell structure, such as an aircraft fuselage. The aspects of the disclosed embodiments also concern a process for manufacturing such a part and a device for implementing such a process.

Figure 1:
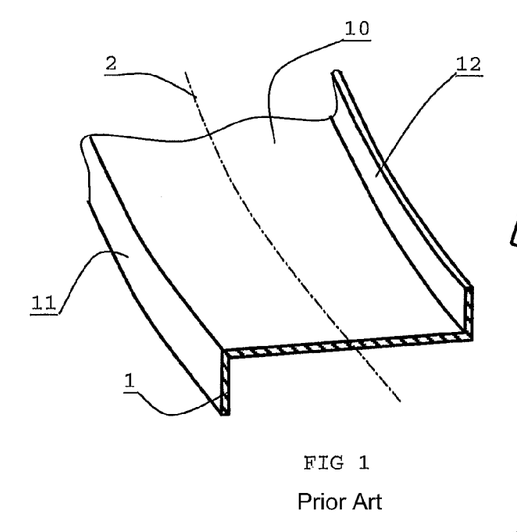
FIG. 1 shows a typical cross section of the curved profile in the disclosed embodiment.
Figure 2:
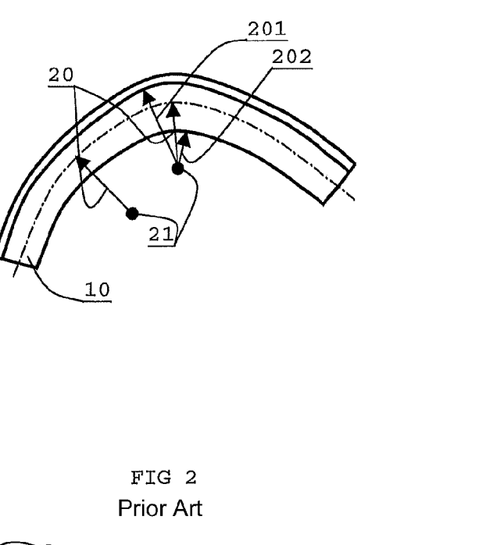
FIG. 2 shows a front view of such a structural part.

In the prior art, such a structural part, FIG. 1, comes in a form whose approximately constant cross section (1) can generally be L, U, Z or J-shaped or more complex forms, with said cross section extending along a non-straight scanning axis (2). The scanning axis (2) is a curve characterized by a succession of radii of curvature (20), FIG. 2, combined at their respective center of curvature (21). The cross section of such a profile includes at least two wings, at least one of them (10) further comprising a radius of curvature that varies with its width (201, 202).

Such structural parts, when they are composed of a composite reinforced-fiber material, are obtained from fibers stacked in a certain direction and in a definite sequence. An example of such a profile is described in French patent application FR20070057431 in the name of the applicant.

In a first embodiment, said profile is obtained by placing a plurality of layers of dry fibers, or plies, with a definite orientation in a mold that has the shape of the section and the curve of the part. Then, the fibers are immersed in the resin by resin transfer or infusion.

Alternately, such structural parts can be obtained by draping plies of impregnated fibers followed by consolidation and curing. Patent EP0436415 describes a process for obtaining such a structural part in which a stack of dry or pre-impregnated fibers, straight and flat, is first made, then applied to a tool with the desired cross section and curve by means of a bladder. The plies initially have an orientation defined in relation to the longitudinal axis of the straight stack. This orientation is kept after the strip is applied to the tools when it is measured in relation to the curved axis of the local curve or, along a complementary angle, in relation to the local radius of curvature.

Patent application WO 2005/011961 describes a process for obtaining such a part in the prior art in which the strips of pre-impregnated material are applied directly to the sectioning and curving tools adapted by means of a draping head combined with pressure rollers.

This operation, which consists of pressing and tightening a fiber preform composed of continuous fibers, pre-impregnated or not, on a curved tool is traditionally called "spreading." For aeronautical applications, the fibers are commonly composed of carbon, and the matrix of a thermosetting resin.

Figure 3:
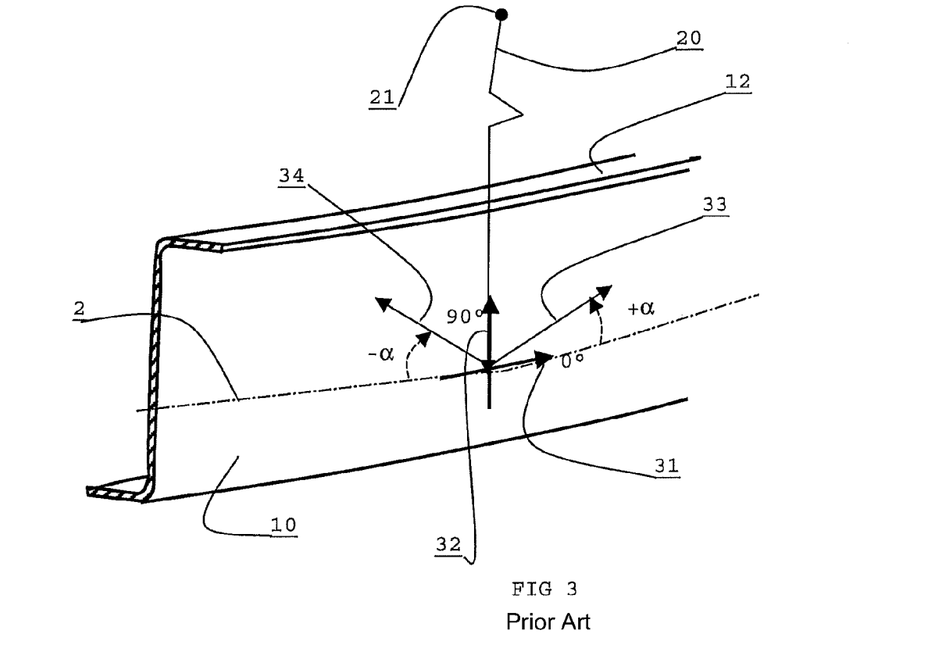
FIG. 3 is a conventional view of the orientations of fibers compared to the radius of curvature and the local curve.

Such fibers have no capacity for plastic deformation so it is difficult, or even impossible, to spread a strip or nap of fibers whose orientation is perpendicular to the local radius of curvature of the form, in the 0° direction, FIG. 3, and whose radius of curvature varies with the width of the strip. Trying to spread such a nap leads to the formation of puckers in said nap, puckers that are particularly damaging to the mechanical hold of the part that contains such a nap of fibers. The difficulty with spreading will be even greater the closer the orientation of fibers placed this way is to the curve, i.e., the angle of orientation of the fibers α, FIG. 3, is close to 0°, the wider the nap and the smaller the radius of curvature, i.e., the higher the gradient of curvature in the width of the nap and the greater the length of the nap.

In effect, when the nap fibers are oriented at an angle α, close to 0°, the spreading is produced by sliding between fibers, parallel to the curve; said sliding must be produced in the resin over the entire length of the fibers. Consequently, it is very hard to place the nap gradually while ensuring such sliding.

Figure 4:
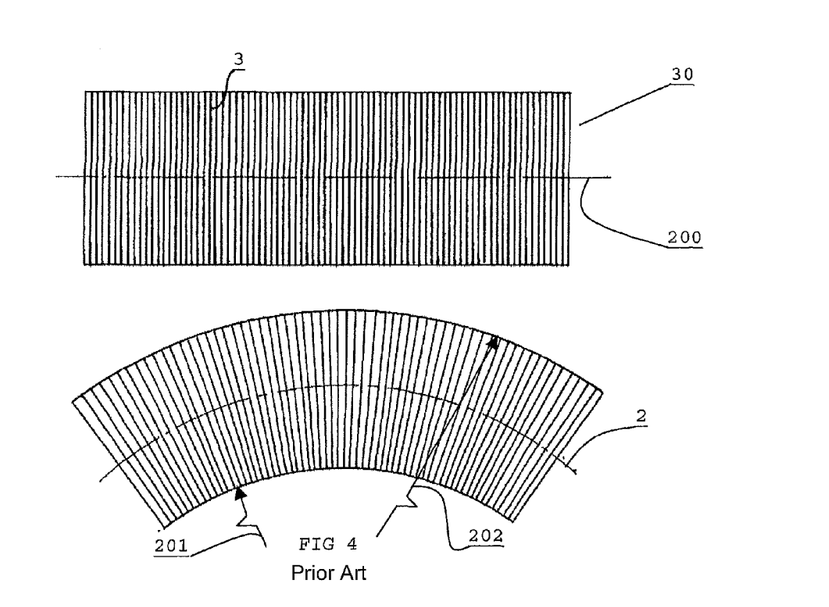
FIG. 4 shows the process of spreading a strip containing fibers oriented along a 90° angle in relation to the initial longitudinal axis.

When the fibers are not perpendicular to the local radius of curvature, and the radius of curvature of the strip varies according to its width, the spreading is produced by a gradual modification, correlative to the radius of curvature, in the space between the fibers (3), FIG. 4.

In this embodiment, consider, for example, a part whose cross section is Z-shaped, FIG. 1; the part of the fibers constituting the preform is in the wing (12) which has no variation in the radius of curvature according to its width and located on the minimum radius of curvature will have no variation in the spacing of the fibers after it is formed. In fact, this part does not undergo spreading and can therefore contain fibers oriented perpendicular to the radius of curvature, that is, parallel to the scanning axis. The center wing (10), currently called the "web", has a variation in curvature according to its width. The portion of fibers located in the web undergoes spreading, and after the fibers are applied to the form, they are spaced more on the largest side of the radius of curvature. The variation in spacing is such that it is proportional to the variation in the radius of curvature and maintains the nominal orientation of the fibers with regard to the curved local axis of curvature. The part of the fibers located in the exterior wing (11) corresponding to the maximum radius of curvature, but which has no variation in the radius of curvature over its width undergoes spreading, but with no variation in the spacing of the fibers over its width.

The spreading of such a section therefore requires precautions in terms of the exterior wing (11), since the parts of fiber located in this portion must first undergo spreading, leading to a variation in the spacing of the fibers proportional to the variation in the radius of curvature, then a tightening of said fibers when the corresponding part is applied to the part of the form forming the wing. To keep it from puckering on this occasion, all of the fibers applied to the form must always be kept under tension. This characteristic is obtained in EP0436415 by the method of progressive action of the bladder and in 202005/011961 by the gradual application, along the curved abscissa, of the fiber preform on the tool, by the pressure rollers.

Such a structural part obtained in this way can be used advantageously to make a shell structure, such as an aircraft fuselage. Making the part of a composite reinforced-fiber material gives it a lower weight than a part made of a metal material with equal mechanical resistance.

Considering the large size of aircraft fuselages for commercial transport, to make them easier to assemble, a structural element such as a frame is composed of several structural pieces forming sectors on the circumference of said fuselage. These sectors are assembled by splicing. Moreover, the interior floor is also connected to the frames, so that the weight of the floor, the passengers and the commercial load that it supports is drained and distributed in the shell structure of which the fuselage is composed. All these connections are generally made with rivet-type fasteners. Such a connection must have enough fasteners to transfer the mechanical load that it supports from one piece to another. And, for it to resist fatigue and peening, rules of spacing between the fasteners must be followed. Now, when the frames are made of a composite reinforced-fiber material, the section of the parts necessary to absorb the service forces does not make it possible to install the number of fasteners suited to take the different loads at the connections while following the spacing rules for said fasteners. One solution consists of using a profile with a wider web to be able to space the fasteners. This solution, besides increasing the weight of the parts, reduces the interior space in the cabin, and hence the volume available for the commercial load in the aircraft. The solutions in the prior art consist of interspersing in these connections, complex splicing parts, generally made of metal. However, such solutions come at a high cost, are detrimental in terms of weight and, due to the high rigidity of the connecting pieces, result in the transmission of parasitic stresses into the structures.

There is therefore a need for composite structural elements, such as circumferential stiffeners of the aircraft fuselage, or frames, whose various connections can be made without such complex parts, but without the widening of the profile being detrimental to the volume available for the commercial load within the shell structure supported by those frames.

SUMMARY

To solve this problem with the prior art, the disclosed embodiments propose a curved structural part made of a composite material with fiber reinforcement with continuous fibers whose cross section has at least two wings, with said fibers extending from one wing to the other, with said structural part further comprising a variation in the width of its section parallel to the local radius of curvature. The structural element resulting from the assembly of parts in the disclosed embodiments thus includes local widening in the section at the connections between the parts comprising the structural element and at the connection with the profiles of the floor, if such a profile is used to make an aircraft fuselage structure. However, such widening of the section does make it possible to obtain a section width adequate for the connections, in order to place the appropriate number of fasteners while following the spacing rules between said fasteners without resorting to complex spliced parts.

In one special embodiment, the variation in width includes a reduction in the minimum local radius of curvature of the part. In this configuration, the structural part is particularly suited for making a shell structure whose circumferential stiffeners are located inside said structure. Thus, the variations in width do not affect the exterior form of the shell structure. Moreover, this variation in the width of the section is less detrimental to the interior volume of the shell structure, and the weight of that structure compared to the solutions in the prior art that consist of widening the whole section of the part.

Advantageously, the structural part in the disclosed embodiments has 3 wings, whose tracks are located in at least two intersecting planes; this configuration corresponds to profiles further comprising approximately a U or Z-shaped cross section, or more complex ones, such as a W-shaped cross section. These cross sections make it possible to stabilize said profile in terms of deformation modes, such as buckling or tilting.

In a first embodiment of stratification, the structural part in the disclosed embodiments has continuous reinforced fibers extending over at least two wings, oriented more or less at an angle $\alpha$ in relation to the local curvature, with $\alpha$ being between 30° and 60°. The presence of these fibers makes it possible for such a structural part to resist flows of tractive, compressive and buckling forces and to be manufactured economically by spreading a fiber preform composed of dry or pre-impregnated fibers.

In a second embodiment of stratification, the structural part also has continuous fibers extending over at least two wings and oriented parallel to the local radius of curvature. The fibers in this so-called 90° direction can also be spread over the tool and reinforce the profile in terms of its modes of deformation by buckling.

In a third embodiment of stratification, the structural part in the disclosed embodiments also includes continuous reinforced fibers perpendicular to the radius of curvature, in the so-called 0° direction, in at least one of the wings. This configuration makes it possible to reinforce said part from tractive or compressive stresses perpendicular to the radius of curvature and, in particular, makes it possible to reinforce the shell structure from buckling.

To preserve the continuity of the fibers, the sectional variations must be made gradually along splicing gradients and/or radii. Splicing gradients that are too high, i.e., too sudden variations in cross section, increase the risk of undulation of the fibers in the area near where the cross section changes. Such undulations are detrimental to the mechanical hold of parts made this way. Splicing gradients that are too small, that is too gradual variations in cross section, increase the radial space required and the weight of a structural part made this way. The structural part in the disclosed embodiments has splicing gradients between 0.07 and 0.15. Such gradients are gradual enough to eliminate a risk of undulation of the fibers in the area near where the cross sections connect, but fast enough not to increase the weight of the part substantially and also make it possible to confine said variations in cross section to areas that do not degrade the habitability of the structure made from such structural parts.

In one especially advantageous embodiment, the structural parts of the disclosed embodiments have splicing radii between the regular zones and the zones with changing widths between 300 mm and 1000 mm. Thus, in the case where such structural parts are used as frames for an aircraft fuselage, the sectional variations can be located in porthole areas for the spliced connections between parts, or under passenger seats for connections between the frames and the floor cross pieces.

According to the disclosed embodiments, the combination of geometric characteristics of the structural part, notably in the areas where the section changes, the stacking sequences of fiber layers and the manufacturing process are such that the deviation in the orientation of the fibers from their nominal orientation is less than 3°. Thus, the actual mechanical characteristics of the part do not differ significantly from its theoretical characteristics, and the part can be dimensioned with a reduced safety factor. This characteristic is particularly important for applications where the weight of the part with a given resistance is a primary factor, such as in aeronautic applications.

Advantageously, the structural part that is the subject of the disclosed embodiments includes a reinforcement of the thickness of the web in the area where the web widens. This characteristic makes it possible to improve the peening resistance of the assembly in that area.

In order to improve the tolerance to damage of the structural part that is the subject of the disclosed embodiments, and particularly its shock resistance, the outer layer of such a part, subject to shock, for example with handling devices within the shell structure, will be made of multidirectional fibers at an angle $\pm\alpha$. This orientation has better tolerance to damage than the 90° and 0° orientations.

Such structural parts can be assembled using rivet or bolt-type fasteners to make structural elements of large sizes, so structural parts for large structures can be made with small means and tools. This ensures manufacturing precision and strictly limits defects in the orientation and undulation of the fibers in the part.

The subject of the disclosed embodiments is also a process for manufacturing such a curved structural part; said process includes the following steps:

Making a mold of the structural element with at least two faces, with said two faces forming a male mold section between the minimum radius of curvature of the structural element and another radius of curvature belonging to one of the two faces;

Preparing a stack of multidirectional fibers consisting of one or more plies of fibers oriented in nominal directions $\pm\alpha$ or 90°, in relation to the longitudinal direction;

Cutting in this stack a strip, with said multidirectional strip extending longitudinally and with a width at least equal to the maximum developed width of the structural element;

Applying the multidirectional strip by pressing it gradually onto the mold so as to mold it to the section and its curvature so that the application of the multidirectional strip is initiated on the face with the minimum radius of curvature, and the strip is then pressed and tightened on the other faces.

Applying the strip to the face with the minimum radius or interior face makes it possible to keep the tension in the strip as it is gradually applied. This tension makes it possible to prevent the formation of puckers in the areas where there are changes in the width of the section whose geometric characteristics correspond to the disclosed embodiments, even if the multidirectional strip does not have any specific cut for this widening. This makes it much easier to place the strip, since it is uniform in width and does not require indexing or making it congruent with the cut and the mold.

The process that is the subject of the disclosed embodiments can also include steps consisting of placing a strip of fibers in the 0° direction along the local curvature over at least one wing prior to placing multidirectional strips or between the placement of two multidirectional strips. The placement of these strips at 0°, which cannot be spread, is done with traditional draping devices for the wings, which have no variation in the radius of curvature over their width or with fiber-placement devices for wings that have a variation in the radius of curvature over their width.

The orientations of the fibers in the different multidirectional layers must be balanced. Thus, when the fibers are placed in the form of a multidirectional strip with an orientation $\pm\alpha$, the corresponding layer is automatically balanced.

On the other hand, if the multidirectional layer has fibers oriented along $+\alpha$ and fibers at 90°, then it must be balanced by the subsequent placement of a multidirectional strip with fibers oriented at $-\alpha$ and 90°.

Finally, the subject of the disclosed embodiments is also a device with means of using the process by placing and spreading multidirectional strips or placing fibers oriented at 0° over the entire length of the part or locally to increase the thickness of the web in the areas where the section widens.

DETAILED DESCRIPTION

Figures 5, 6:
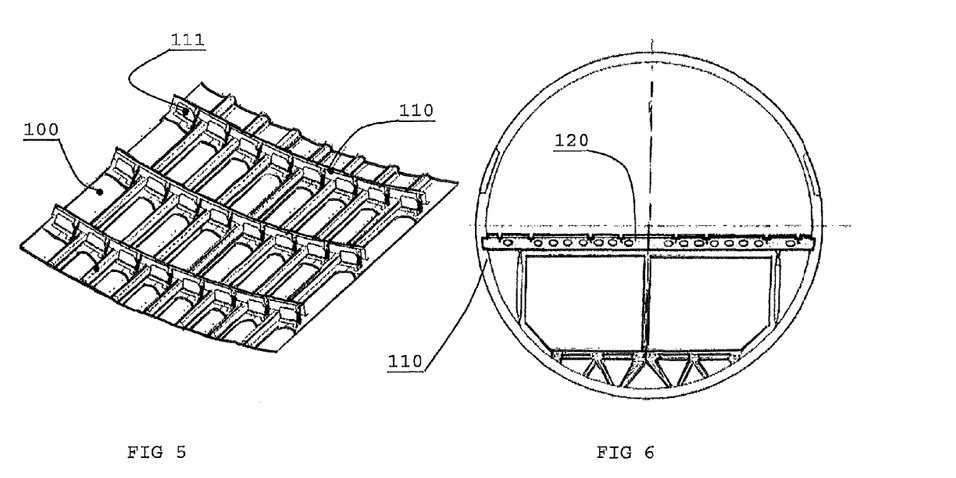
FIG. 5 is a schematic view of the formation of a stiffened panel as used in making an aircraft fuselage.
FIG. 6 is a view of a regular section of an aircraft.

The structure of an aircraft fuselage is basically comprised of stiffened panels, FIG. 5, further comprising a skin (100), circumferential stiffeners or frames (110) connected to the skin by clips (111).

The skin and the longitudinal stiffeners drain the primary forces associated with the flexure and torsion of the fuselage as well as with pressurization. The frames support the fuselage structure, preventing it from buckling due to the effect of the primary loads, and distribute the forces, such as passenger weight, at points in the structure.

To this end, the cross pieces supporting the floor (120), FIG. 6, are spliced to the frames. This splicing is commonly done with a series of rivet-type fasteners (130). Each of these fasteners can transmit a definite load as a function of its diameter and the thickness of the parts assembled. The dimensioning of such fasteners is governed by the criteria of peening and sheering resistance. The number of fasteners needed to make the connection will therefore be a function of the load being transmitted and the individual resistance of each fastener. And there must be some spacing between the fasteners. This spacing is such that the section of resistant material between two fasteners or between a fastener and the edge of the parts assembled is sufficient in terms of load. These stresses result in spacing rules for the fasteners, depending on their nature and the materials assembled.

In the case of composite fiber-reinforced materials, the spacing rules for the fasteners do not make it possible to house all of the fasteners needed to transmit the load in the width of the parts, when said parts are dimensioned vis-à-vis their resistance to the stresses that come from the primary load.

This is true of the floor frame/cross-piece connection, or of certain splices between basic structural parts comprising a frame or splices of frame sectors opposite one another, at the longitudinal junctions between fuselage subassemblies.

Figure 7:
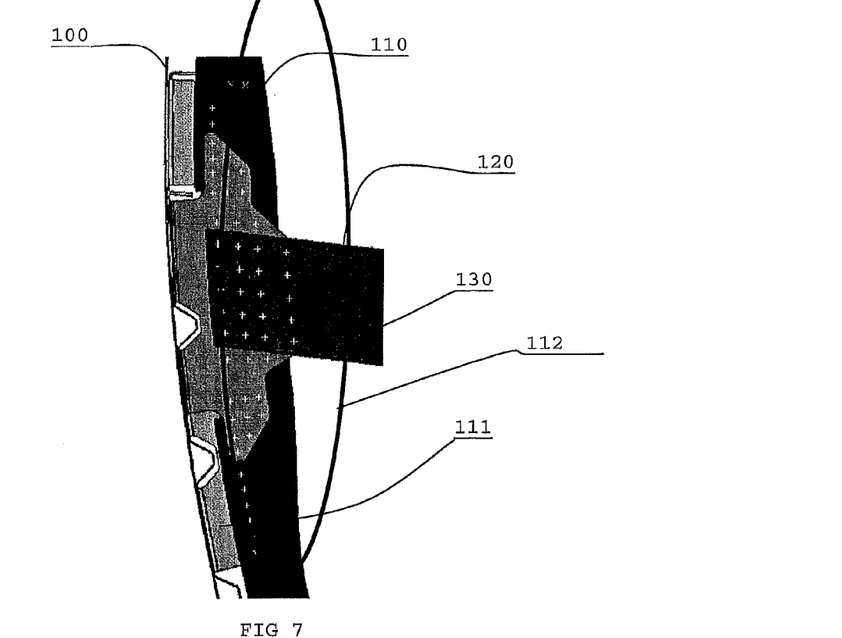
FIG. 7 shows an example of splicing an aircraft floor cross piece with a structural piece according to the disclosed embodiment.
Figure 8:
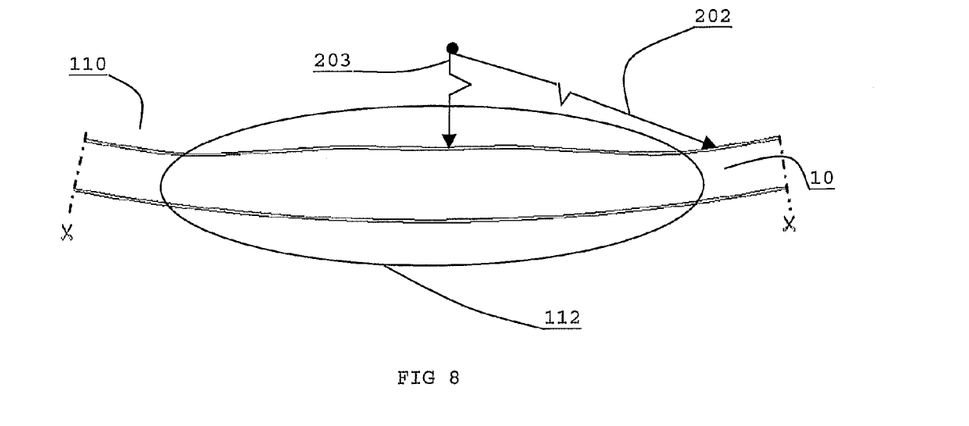
FIG. 8 gives an example of widening toward the interior of the cross section of the structural part in the disclosed embodiment.
Figure 9:
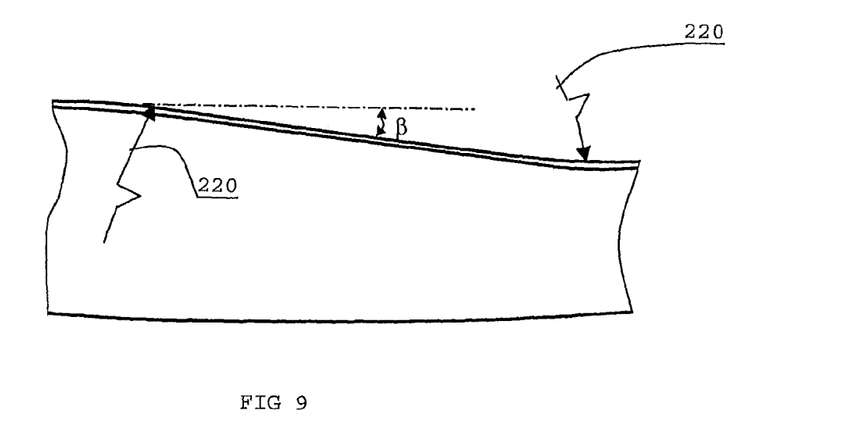
FIG. 9 gives splicing details in terms of gradients and the blending radius of such widening of the section with the regular section of the structural part in the disclosed embodiment.

To solve this technical problem, the disclosed embodiment proposes (see FIG. 7) structural parts composed of a composite reinforced-fiber material in the form of continuous fibers, with local widening of the section (112) parallel to the local radius of curvature (202, 203). The outside of such a structural part is supported on the skin (100) by clips (111). The outer radius of this structural part corresponds approximately to the fuselage radius. The section is therefore preferably widened by widening the inside of the fuselage, that is, the edge (203) of the widened section (112) is of a radius of curvature less than the radius of curvature (202) of the regular section.

The cross section of such parts can take different forms, depending on the number of wings. The simplest form with 2 wings (10, 12) has an L-shape. More complex forms can be considered without going beyond the field of the disclosed embodiments. For example, if the contour of a wing projecting into a plane perpendicular to that wing and containing all of its curved contour is called a "track," the disclosed embodiments address any type of profile whose tracks of the different wings are contained in at least two intersecting planes. Examples are L, U and W-shaped sections. Such sections are relatively symmetrical in shape (U or W-shaped sections) or relatively anti-symmetrical (L-shaped sections) compared to their median axis (2), and the widths and thicknesses of the so-called symmetrical or anti-symmetrical wings can nonetheless be different. Such sections are advantageous, since they are stable vis-à-vis modes of deformation by buckling and tilting.

The fabrication of a structural part with a local section widening toward the interior by spreading strips of multidirectional fibers on a preform poses several technical problems according to the processes in the prior art. In fact, since there is a reduction in the local radius of curvature, the spreading mechanism is reflected by a tightening of the fibers in the area where the section changes. This tightening can be reflected in the creation of puckers or undulations in the fibers.

The absence of puckers can be obtained by maintaining a constant tension in the strip laid in this way; however, the known processes in the prior art do not make it possible to control this condition, so that such a structural part cannot be fabricated economically and reproducibly.

The disclosed embodiments make it possible, through a combination of geometric characteristics of the parts and their method of fabrication, to make such parts in a reproducible and economical way.

To obtain this particular form of curved structural part and prevent the formation of puckers or undulation of fibers while maintaining the orientation of the fibers within a tolerance of ±3° compared to their nominal orientation, the disclosed embodiments combine a placement and spreading process consisting of gradual placement of preconstituted multidirectional strips.

The placement is done gradually along the length of the strip, on one hand, and, at any point on the length, gradually along the width, by first applying the strip to the wing (12) further comprising the minimum radius of curvature. This configuration makes it possible always to keep the strip under tension, both along its length and width, even when the section changes and the local radius of curvature (203) of the interior wing (12) is reduced. Keeping this tension is greatly facilitated by the gradients ($\beta$) and/or blending radii (220) in the areas where the section changes (112).

Figure 10:
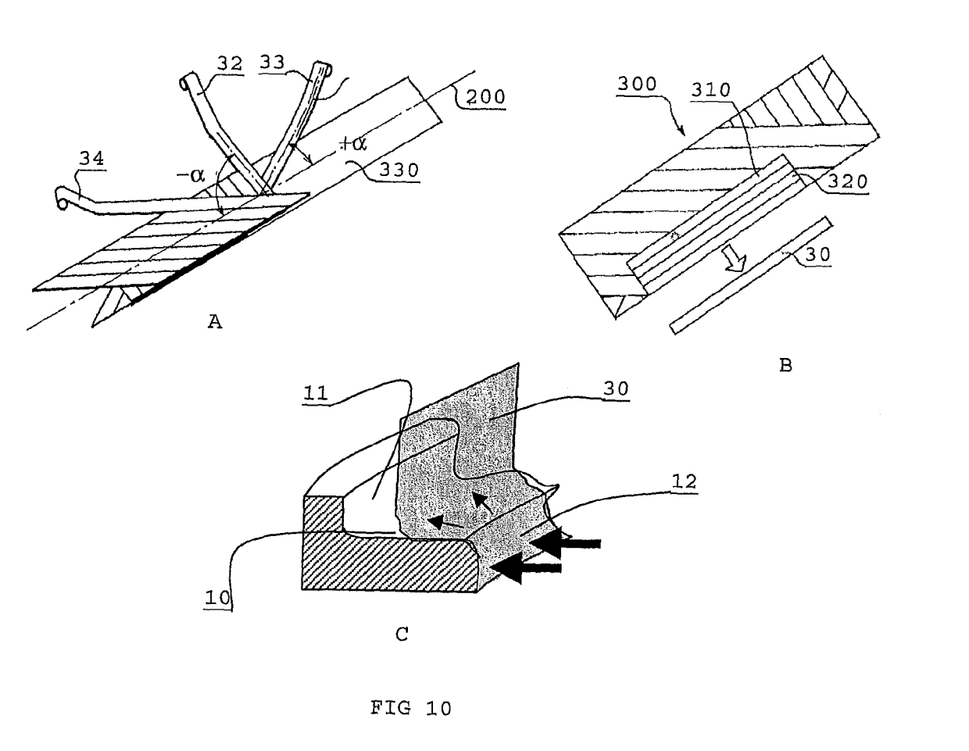
FIG. 10 is a synopsis of the process in the disclosed embodiment.

According to the disclosed embodiment, FIG. 10A, the process consists of draping a plate (300) of pre-impregnated fibers in directions ±α and/or 90° (32, 33, 34), compared to the longitudinal axis of placement (200). The fibers draped in this way come in the form of unidirectional, preferably nonwoven naps. Such naps are available in large widths and thus permit very high placement rates when placed flat. Such plates are draped on a support (330) which can be paper or advantageously a material elastic enough to not impede the spreading of the strips during the placement operations. As an example, the strip can be polyethylene or silicone.

Strips with the appropriate width (320) and length (310), FIG. 10B, are cut in this plate by any means known to a person skilled in the art, such as a vibrating blade, water jet, laser, etc.

Advantageously, these strips are uniform in width over their entire length. The width is equal to the maximum developed width of the structural part being fabricated. The strip is then gradually applied to the tool reproducing the shape of the part to be obtained, by applying the strip to the face (12) of the minimum radius of curvature. This gradual application can be done by any means known to the person skilled in the art, but will be done advantageously by winding up the strip beforehand, with the support (330) preventing it from sticking to itself, then placing said strip with a draping head combined with pressure rollers (40). The pressure rollers then act on the multidirectional strip (30), which prevents the multidirectional strip from getting stuck to said pressure rollers.

Advantageously, the draping head has means of heating in order to reduce the viscosity of the resin in spots during placement, which is good for spreading.

Figure 11:
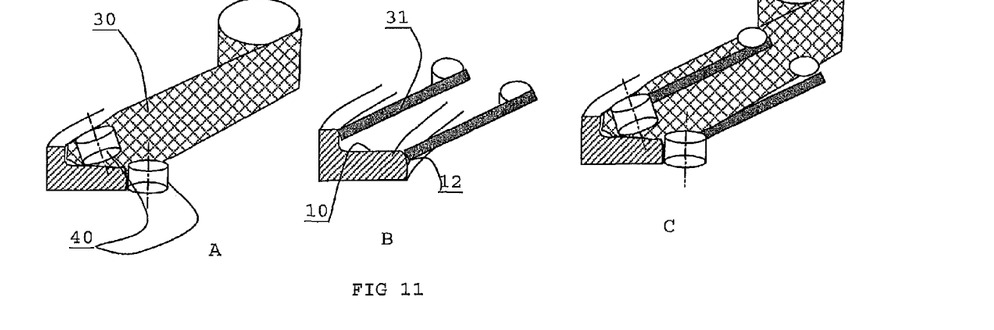
FIG. 11 shows optional steps in the process in the disclosed embodiment consisting of mounting strips of unidirectional fibers on the wings of the profile.

In FIG. 11B, unidirectional strips oriented at 0° can be placed prior to the placement of a multidirectional strip. Such strips can be placed by traditional draping techniques on the wings which do not have any or have a small variation in the radius of curvature over their width or, can be placed by fiber-placement techniques on the wings, such as the web (10), which have a variation in the radius of curvature. Such placements of unidirectional fibers at 0° and 90° can also be done, as in FIG. 11C, between the placement of two multidirectional strips or simultaneously with the placement of a multidirectional strip.

Figure 12:
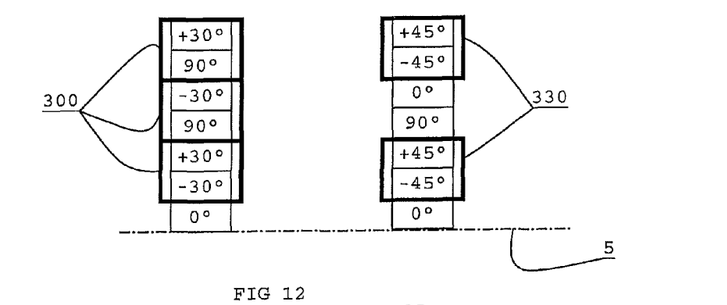
FIG. 12 shows examples of the stratification sequence for the structural part in the disclosed embodiment.
Figure 13:
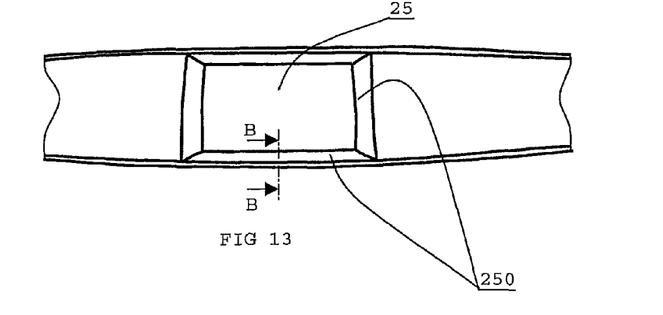
FIG. 13 shows an example of local reinforcement of the thickness of the structural part in the disclosed embodiment.

FIG. 12 gives examples of stratification sequences for the sections in the disclosed embodiment. The orientations of corresponding fibers are balanced and symmetrical in relation to the neutral axis (5) of the section of the profile. According to the disclosed embodiment, several embodiments are possible, using multidirectional strips (300) further comprising ±α fiber orientations or 90° and +α fiber orientations, followed by the placement of one further comprising 90° and +α orientations.

Figure 14:
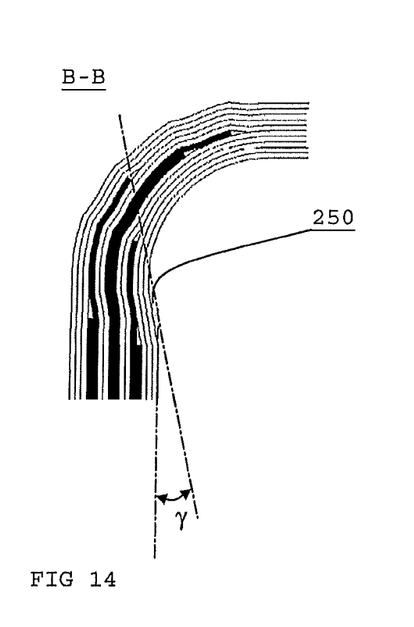
FIG. 14 is a sectional view of local reinforcement of thickness showing the plies designed to obtain a splicing gradient that can drain the shearing flux toward the whole fibrous structure of the structural part in the disclosed embodiment.

To further improve the peening resistance of the splicing area, it is possible to increase the thickness of the area locally by draping and spreading additional plies for reinforcement. To distribute the flows of force applied to this reinforcement and particularly to drain the shearing stresses toward the whole thickness of the laminated material, such reinforcement must be connected to the regular structure of the part by gradients (250) at angle γ. These gradients are obtained by releases of plies, FIG. 14, so as to obtain a gradual change in thickness. Typically, an angle γ of 5°, i.e. a gradient of 0.2, makes it possible to drain the shearing flows toward the fiber structure and thus prevent the delamination of such a reinforcement.

The invention claimed is:

1. A structural part curving along a length of the part, said curved structural part comprised of a composite material reinforced with continuous fibers, said curved structural part having a section which includes at least two wings, with said fibers extending over the at least two wings, said length of said curved structural part having a greater extent than a width of said curved structural part and a length of said wings having a greater extent than a width of said wings, said widths being locally perpendicular to said lengths, said curved structural part and said wings further each having a thickness extending generally perpendicular to said widths and said lengths, the thicknesses having a lesser extent than said widths, at least one of said wings of said curved structural part having a first full width along a length of the at least one wing and including a second full width of said same at least one wing along a second, different, but adjacent length of the at least one wing comprising a local increase in the width of said at least one wing as compared to the first full width, the second full width of said at least one wing being of a section parallel to a local radius of curvature wherein, in the same region of the at least one wing, the local increase in the width of the section is an increase in the first full width of the at least one wing in a direction towards an interior of a curve of the curved structural part without an increase in the first full width in a direction towards an exterior of the curve of the curved structural part.

2. The curved structural part of claim 1, comprising three wings whose tracks are located in at least two intersecting planes.

3. The curved structural part of claim 1, further comprising continuous fibers extending over at the least two wings oriented in a nominal direction + or −α in relation to the curve, with α being between 30° and 60°.

4. The curved structural part of claim 3, further comprising continuous fibers, so-called 90°, extending over at least two wings oriented parallel to a local radius of curvature.

5. The curved structural part of claim 4, further comprising continuous fibers, so-called 0°, oriented perpendicularly to the radius of curvature in at least one of the wings.

6. The curved structural part of claim 5, wherein the local increase in the width of the section is done gradually along a gradient β, with β being between 0.07 and 0.15.

7. The curved structural part of claim 6, further comprising blending radii between regular parts and changing section parts, said radii being between 300 mm and 1000 mm.

8. The curved structural part of claim 7, wherein the continuous fiber reinforcements extending over at least two wings have, at any point on the curved structural part, an effective orientation in relation to a local curve between +3° and −3° compared to their nominal orientation (α).

9. The curved structural part of claim 1, further comprising a multidirectional layer along an angle +/− α on exterior faces of the curved structural part.

10. A structural element comprising an assembly of at least two structural parts, according to claim 1.

11. An aircraft having a curved structural part according claim 1.

12. The curved structural part of claim 1, wherein the local variation in the width of the section is done along a gradient β between 0.07 and 0.15.

13. A structural part curving along a length of the part, said curved structural part comprised of a composite material reinforced with continuous fibers, said curved structural part having a section which includes at least two wings, with said fibers extending over the at least two wings, said length of said curved structural part having a greater extent than a width of said curved structural part and a length of said wings having a greater extent than a width of said wings, said widths being locally perpendicular to said lengths, said curved structural part and said wings further each having a thickness extending generally perpendicular to said widths and said lengths, the thicknesses having a lesser extent than said widths,
at least one of the wings of said curved structural part including a region of the at least one wing with a first full width of said at least one wing along a length of the at least one wing and including a second full width of said same at least one wing along a second, different but adjacent region of the part comprising a local increase in the width of said at least one wing in a section parallel to a local radius of curvature as compared to the first full width of said at least one wing,
wherein, in the same second region of the at least one wing, the thickness of the same at least one wing is increased relative to the thickness of the same at least one wing adjacent to the second region,
the increase of the thickness of the same at least one wing being provided by a gradient of approximately 0.2.

14. The curved structural part of claim 13, comprising three wings whose tracks are located in at least two intersecting planes.

15. The curved structural part of claim 13, further comprising continuous fibers extending over at least two wings oriented in a nominal direction + or − α in relation to the curve, with α being between 30° and 60°.

16. The curved structural part of claim 15, further comprising continuous fibers, so-called 90°, extending over at least two wings oriented parallel to a local radius of curvature.

17. The curved structural part of claim 16, further comprising continuous fibers, so-called 0°, oriented perpendicularly to the radius of curvature in at least one of the wings.

18. The curved structural part of claim 17, wherein the continuous fiber reinforcements extending over the at least two wings are maintained within 3° of their nominal orientation.

19. The curved structural part of claim 13, further comprising a multidirectional layer with fiber reinforcements arranged along an angle +/− β on exterior faces of the curved structural part, where α is between 30 and 60°.

20. A structural element comprising an assembly of at least two structural parts, according to claim 13.

21. An aircraft having a curved structural part according claim 13.

22. A structural part curved along a length of the part, said curved structural part comprised of a composite material reinforced with continuous fibers, said curved structural part having a section which includes at least two wings, with said fibers extending over the at least two wings,
said length of said curved structural part having a greater extent than a width of said curved structural part and a length of said wings having a greater extent than a width of said wings, said widths being locally perpendicular to said lengths, said curved structural part and said wings further each having a thickness extending generally perpendicular to said widths and said lengths, the thicknesses having a lesser extent than said widths,
at least one of said wings of said curved structural part having a first full width along a length of the at least one wing and including a region of the same at least one wing with a second full width along a second, different but adjacent length of the at least one wing comprising a local increase in the width of a section parallel to a local radius of curvature as compared to the first full width, the local increase in the width of the section of the at least one wing being provided with a gradient in the range of 0.07 and 0.15, wherein, in the same region of the at least one wing, the local increase in the width of the section is an increase in the first full width in a direction towards an interior of a curve of the curved structural part without an increase in the first full width of the at least one wing in a direction towards an exterior of the curve of the curved structural part, wherein, in the same region of the at least one wing, the thickness of the at least one wing is increased relative to the thickness of the at least one wing adjacent to the region, the increase of the thickness of the at least one wing being provided by a gradient of approximately 0.2, the orientation of the fibers in each stratum being maintained within 3° of their nominal orientation.

* * * * *